United States Patent [19]
Frank

[11] Patent Number: 4,461,691
[45] Date of Patent: Jul. 24, 1984

[54] ORGANIC CONDUCTIVE FILMS FOR SEMICONDUCTOR ELECTRODES

[75] Inventor: Arthur J. Frank, Lakewood, Colo.

[73] Assignee: The United States of America as represented by the United States Department of Energy, Washington, D.C.

[21] Appl. No.: 465,418

[22] Filed: Feb. 10, 1983

[51] Int. Cl.$^3$ ............ C25B 11/04; C25B 11/06; C25B 5/00; H01M 6/36

[52] U.S. Cl. .................. 204/242; 204/78; 204/79; 204/DIG. 3; 204/290 R; 429/111; 204/129

[58] Field of Search ............ 204/290 R, 242, DIG. 3, 204/129, 78, 79; 429/111

[56] References Cited

U.S. PATENT DOCUMENTS

| | | | |
|---|---|---|---|
| 4,094,751 | 6/1978 | Nozik | 204/80 |
| 4,167,461 | 9/1979 | Dickson et al. | 204/102 |
| 4,219,392 | 8/1980 | Halmann | 204/72 |
| 4,379,740 | 4/1983 | Nazzal et al. | 204/129 |
| 4,414,080 | 11/1983 | Williams et al. | 204/129 |

OTHER PUBLICATIONS

A. J. Frank et al., "Polypyrrole-Coated Semiconductor Electrodes", Extended Abstract No. 616, Electrochemical Society Meeting, Montreal, Canada, May 1982.

T. Skotheim et al., "Stabilization of n-Si Photoanodes to Surface Corrosion in Aqueous Electrolyte with a Thin Film of Polypyrrole", *J. Electrochem. Soc.*, vol. 128, pp. 1625-1626, (1981).

R. Dominey et al., "Improvement of Photoelectrochemical Hydrogen Generation by Surface Modification of P-Type Si Semiconductor Photocathodes", *J. Am. Chem. Soc.*, vol. 104, pp. 467-482, (Jan. 1982).

P. K. Ghosh et al., "Electroactive Coatings of Tris(-Bipyridyl)-and Tris(O-phenanthroline)-Ruthenium (II) Attached to Electrodes via Hydrosilylation or Electropolymerization of Vinyl Derivatives", *J. Electrochem. Soc.*, vol. 128, pp. 1281-1287, (1981).

R. Noufi et al., "Enhanced Stability of Photoelectrodes with Electrogenerated Polyaniline Films", *J. Electrochem. Soc.*, vol. 129, pp. 2261-2265, (1982).

H. D. Abruna et al., "Semiconductor Electrodes 40 Photoassisted Hydrogen Evolution at Poly(Benzylriologen) Coated P-Type Si Electrodes", *J. Am. Chem. Soc.*, vol. 103, pp. 6901-6904, (1981).

O. Haas et al., "Mediated Electron Transfer Demonstrated with [Ru (BIPY)$_2$Cl Poly(4-Vinylpyridine]Cl Coated MoSe$_2$ & WSe$_2$ Photoanode", *Electrochem. Acta.*, vol. 27, pp. 991-994, (1982).

H. D. Abruna et al., "Rectifying Interfaces Using Two-Layer Films of Electrochemically Polymerized Vinylpyridine and Vinylbipyridine Complexes of Ruthenium and Iron on Electrodes", *J. Am. Chem. Soc.*, vol. 103, pp. 1-5, (1981).

G. Cooper et al., *Nature*, vol. 295, pp. 578-580, (Feb. 1982).

F. R. Fan et al., *J. Electrochem. Soc.*, vol. 128, pp. 2042-2045, (1981).

A. J. Frank et al., SERI/TP-233-1566, (Mar. 1982).

Y. Nakato et al., *Ber. Bunsenges Physik Chem.*, vol. 80, pp. 1289-1293, (1976).

R. Noufi et al., *J. Am. Chem. Soc.*, vol. 103, pp. 1849-1850, (1981).

R. Noufi et al., *J. Electrochem. Soc.*, vol. 128, pp. 2596-2599, (1981).

T. Skotheim et al., *Appl. Phys. Lett.*, vol. 40, pp. 281-283, (Feb. 1982).

G. Pez et al., *J. Am. Chem. Soc.*, (1982).

*Primary Examiner*—Aaron Weissstuch
*Attorney, Agent, or Firm*—Kenneth L. Richardson; Jeannette M. Walder; Michael F. Esposito

[57] ABSTRACT

According to the present invention, improved electrodes overcoated with conductive polymer films and preselected catalysts are provided. The electrodes typically comprise an inorganic semiconductor overcoated with a charge conductive polymer film comprising a charge conductive polymer in or on which is a catalyst or charge-relaying agent.

20 Claims, 3 Drawing Figures

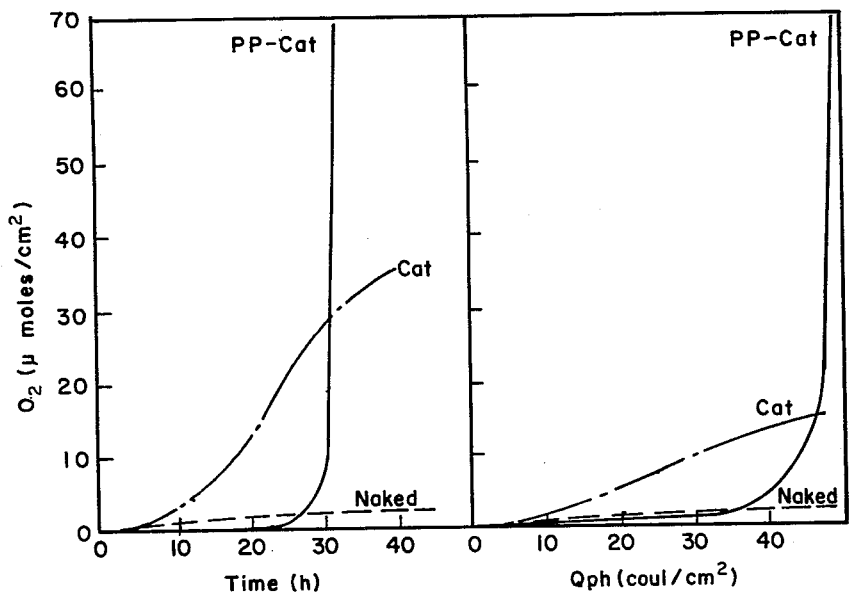

Dependence of $O_2$ production of a naked, catalyst-coated (Cat), and polypyrrole-catalyst-covered (PP-Cat) n-type CdS photoanodes in a 0.5 M $Na_2SO_4$ solution at pH 8.6 on (a) time and (b) charge density.

Fig. 2

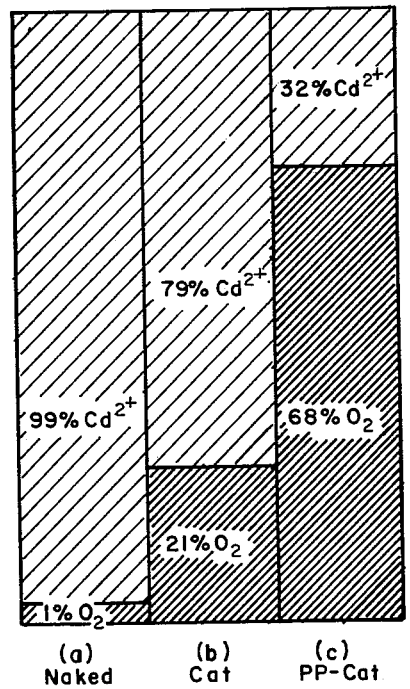

The percent of $O_2$ and $Cd^{2+}$ ions produced from a naked, catalyst-coated (Cat), polypyrrole-catalyst-covered (PP-Cat) n-type CdS photoanode in a 0.5 M $Na_2SO_4$ solution at pH 8.6 after 49 $C/cm^2$ was passed.

Fig. 3

ORGANIC CONDUCTIVE FILMS FOR SEMICONDUCTOR ELECTRODES

CONTRACTUAL ORIGIN OF THE INVENTION

The United States Government has rights in this invention pursuant to Contract No. EG-77-C-01-4042 between the U.S. Dept. of Energy and the Midwest Research Institute.

BACKGROUND OF THE INVENTION

1. Field of the Invention

This invention relates to the field of photoelectrochemistry and, in particular, to photoelectrochemical cells having coated semiconductor electrodes which enhance the efficiency of the photoelectrochemical devices. More specifically, the present invention relates to protective and catalytic coatings for semiconductor electrodes including particulate semiconductor microelectrode systems.

2. Description of the Prior Art

The field of photoelectrochemistry is recognized as having the potential to enable solar energy utilization to meet many of the energy needs of the future. Through the action of light, photoelectrochemical cells can be used to generate electric power and/or to synthesize fuels and desired chemicals from abundant, renewable resources such as water, nitrogen, and carbon dioxide.

Photoelectrochemical cells can be configured such that one or both electrodes are photoactive semiconductors. The electrodes are in contact with an electrolyte which may be in liquid form or may also comprise a solid polymer matrix. A junction is formed at the semiconductor-electrolyte interface in the dark as the two phases come into electronic equilibrium such that the Fermi level of the semiconductor, $E_f$, equals the electrochemical potential of the solution, $E_{redox}$, producing a barrier height which depends on the nature of the solution species and the specific semiconductor. Upon illumination of the semiconductor with light energy equal to or greater than that of the semiconductor bandgap, electrons are promoted from the valence band to the conduction band, creating electron-hole pairs at or near the interface. The electron-hole pairs are spatially separated by the semiconductor junction barrier, and are injected into the electrolyte at the respective electrodes to produce electrochemical oxidation and reduction reactions.

When electrical power is the only output of the cell, only one effective redox couple is present in the electrolyte. The reaction occurring at one electrode is the reverse of that at the other and no net chemical change occurs in the electrolyte ($\Delta G=O$). Photoelectrochemical cells for solar photolysis and photoelectrolysis contain at least two different redox couples, and light energy induces a current flow that produces a net chemical change in the electrolyte ($\Delta G \neq O$). If $\Delta G$ of the net electrolyte reaction is negative, the process is exergonic, and light energy only provides the activation energy for the thermodynamically downhill reaction. If $\Delta G$ of the net reaction is positive, the process is endergonic, and light energy is converted into chemical energy. When the valence-band holes and the conduction-band electrons have sufficient energy for the respective oxidation and reduction half-reaction, no supplementary external voltage is required and the cell operates spontaneously. An example of such a known process is the photolysis of water into $H_2$ and $O_2$ with suspended platinized $TiO_2$ particles. The semiconductor particles behave as a short-circuited photocell. The illuminated $TiO_2$ surface acts as the photoanode to oxidize water to $O_2$, and the Pt region serves as an effective reduction site for hydrogen formation. Several relatively stable semiconductors such as $SrTiO_3$, $KTaO_3$, and $Nb_2O_5$ require no external bias to generate $H_2$ and $O_2$. However, such semiconducting oxides have large bandgaps (3.4–3.5 eV; 365 nm–354 nm) and absorb very little of the terrestrial solar spectrum. U.S. Pat. Nos. 4,090,933 and 4,011,149 are exemplary of prior art cells for the photoelectrolysis of water using solar energy and teach the use of an external bias of from 0 V to about 1 V. An economically viable photoelectrochemical solar cell will probably require solar conversion efficiencies above 10% and long-term stability. Efficient conversion of solar light energy to electrical power requires the optimization of the product of the external photovoltage and photocurrent.

A theoretical maximum of about 30% efficiency is reached for a bandgap of 1.3 eV ($\lambda=960$ nm) and exceeds 20% in the 1.7 to 1.1 eV ($\lambda=735$ to 1380 nm) range. Theoretical efficiencies higher than 50% have been determined for photoelectrochemical cells consisting of multiple semiconductors, each absorbing part of the solar spectrum. The efficiency for the generation of fuels and desired chemicals will depend on the specific process. For example, thermodynamically, the electrolysis of water at standard conditions requires 1.23 eV per charge, and depending on the current density of the cell, a minimum of about 0.3 to 0.4 eV additional energy is required to sustain the reaction. Thus, the minimum average bandgap of semiconductors must be at least 1.5 eV. The maximum bandgap to achieve solar conversion efficiencies above 10% is likely to be less than 3.0 eV, preferably less than 2.3 eV for a single-photoelectrode-based cell.

A major impediment to the exploitation of photoelectrochemical cells in solar energy conversion and storage is the susceptibility of small bandgap semiconductor materials to photoanodic and photocathodic degradation. The photoinstability is particularly severe for n-type semiconductors where the photogenerated holes, which reach the interface, can oxidize the semiconductor itself. In fact, all known semiconducting materials are predicted to exhibit thermodynamic instability toward anodic photodegradation. Whether or not an electrode is photostable then depends on the competitive rates of the thermodynamically possible reactions, namely, the semiconductor decomposition reaction and the electrolyte reactions.

Examples of photoanodic decomposition reactions are compiled in Table I.

TABLE 1

Examples of Photoanodic Decomposition Reactions of Various Semiconductor Electrodes

| Semiconductor | Decomposition Photoanodic Process |
|---|---|
| Si | $Si + 4h^+ + 2H_2O \rightarrow SiO_2 + 4H^+$ |
| GaAs | $GaAs + 6h^+ + 5H_2O \rightarrow Ga(OH)_3 + HAsO_2 + 6H^+$ |
| GaP | $GaP + 6h^+ + 6H_2O \rightarrow Ga(OH)_3 + H_3PO_3 + 6H^+$ |
| CdS | $CdS + 2h^+ \rightarrow Cd^{2+} + S$ |
| CdSe | $CdSe + 2h^+ \rightarrow Cd^{2+} + Se$ |
| $MoS_2$ | $MoS_2 + 18h^+ + 12H_2O \rightarrow MoO_3{}^{2-} + 2SO_4{}^{2-} + 24H^+$ |
| $WO_3$ | $WO_3 + 2h^+ + 2H_2O \rightarrow WO_4{}^{2-} + \frac{1}{2}O_2 + 4H^+$ |

Photoanodic instability of the semiconductor entails ionic dissolution, gas evolution, and/or formation of a new phase of the electrode that may block charge transmission to the electrolyte. Both solvation effects and multiple-hole reactions are involved in the decomposition mechanism. Several approaches have been employed to suppress the photocorrosion of n-type photoanodes utilized for the generation of electrical power. By suitable selection of a redox couple, the photogenerated holes can be removed rapidly before corrosion occurs. For example, the addition of $S_n^{2-}$ to the electrolyte suppresses the photocorrosion of CdS. Among the factors implicated in the stabilizing action are the more favorable redox potential for hole transfer to $S_n^{2-}$ compared with self oxidation of CdS; preferential adsorption of $S_n^{2-}$ on CdS and the concomitant shielding of the surface atoms from the solvent; the common ion effect; the favorable kinetic behavior of the chalcogenide redox couple, which facilitates hole abstraction; and the surface morphology. The addition of one or more polychalcogenide ions ($S_n^{2-}$, $Se_n^{2-}$, or $Te^{2-}$) has been used to stabilize CdS, CdSe, CdTe, GaAs, and InP. A variety of other reducing agents [$I_3^-$, $Fe(CN)_6^{4-}$, $Fe^{2+}$, $Ce^{3+}$, etc.] have also been employed to scavenge the photogenerated holes at rates that suppress anodic decomposition.

It is also known that photodecomposition can be suppressed by using nonaqueous solvents, molten salts, and high concentrations of electrolytes. In part, these methods are intended to reduce the solvation effects of water and thus to shift the photodecomposition potential to positive values. Other approaches to stabilize the semiconductor have relied on a high concentration of a redox couple in the electrolyte, specific adsorption of a species acting as a charge relay, or covalent attachment of a charge mediator to the electrode surface. These methods are designed to facilitate charge removal and thus to reduce the steady-state population of photogenerated holes at the interface.

The range of approaches for suppression of the photocorrosion problem in cells for chemical production is more severe than that for electricity-generating cells. This is particularly true if the electrolyte contains water. Table II illustrates some examples of fuel producing reactions in aqueous electrolytes.

TABLE 2

Some endergonic fuel generation reactions starting with $N_2$, $CO_2$, and $H_2O$

| Reaction | H° (kJ mol$^{-1}$)$^a$ | G° (kJ mol$^{-1}$)$^a$ |
| --- | --- | --- |
| $H_2O(l) \rightarrow H_2(g) + \frac{1}{2}O_2(g)$ | 286 | 237 |
| $CO_2(g) + H_2O(l) \rightarrow HCOOH(l) + \frac{1}{2}O_2(g)$ | 270 | 286 |
| $CO_2(g) + H_2O(l) \rightarrow HCHO(g) + O_2(g)$ | 563 | 522 |
| $CO_2(g) + 2H_2O(l) \rightarrow CH_3OH(l) + \frac{3}{2}O_2(g)$ | 727 | 703 |
| $CO_2(g) + 2H_2O(l) \rightarrow CH_4(g) + 2O_2(g)$ | 890 | 818 |
| $N_2(g) + 3H_2O(l) \rightarrow 2NH_3(g) + \frac{3}{2}O_2(g)$ | 765 | 678 |
| $CO_2(g) + H_2O(l) \rightarrow \frac{1}{6}C_6H_{12}O_6(s) + O_2(g)$ | 467 | 480 |

1 eV = 23.06 K cal/mol = 96.485 kJ/mol
1 J. = 0.23901 cal

Water is a particularly attractive source of hydrogen for the reduction of materials such as $N_2$ and $CO_2$ as well as for the direct generation of $H_2$. Water can only be used, however, if the semiconductor electrodes are stable in its presence. In the illustrations, the production of energy-rich materials (e.g., $H_2$, $CH_3OH$, $CH_2O$, $CH_2O_2$, and $NH_3$) is associated with $O_2$ evolution. A major problem in photoelectrochemistry is that the oxidation of water at the photoanode of nonoxide n-type materials is thermodynamically and kinetically disfavored over the reaction of the valence band holes with the semiconductor lattice. In fact, all known monoxide and many oxide n-type photoanodes are susceptible to photodegradation in aqueous electrolytes.

Approaches have been used to control the photoinstability of the semiconductor-electrolyte interface using surface coating techniques. For example, to stabilize semiconductor surfaces from photodecomposition, noncorroding layers of metals or relatively stable semiconductor films have been deposited onto the electrode surface. It has been reported that continuous metal films which block solvent penetration can protect n-type GaP electrodes from photocorrosion. However, if the films are too thick for the photogenerated holes to penetrate without being scattered, they assume the Fermi energy of the metal. Then the system is equivalent to a metal electrolysis electrode in series with a metal-semiconductor Schottky barrier. In such a system, the processes at the metal-semiconductor junction control the photovoltage and not the electrolytic reactions. In general, a bias is required to drive the water oxidation. In other cases, the metal can form an ohmic contact that leads to the loss of the photoactivity of the semiconductor. In discontinuous metal coatings, the electrolyte contacts the semiconductor, a situation which can lead to photocorrosion. For example, discontinuous gold films do not seem to protect n-type GaP from photocorrosion.

Corrosion-resistant wide-bandgap oxide semiconductor ($TiO_2$ and titanates mostly) coatings over narrow-bandgap n-type semiconductors such as GaAs, Si, CdS, GaP, and InP have been shown to impart protection from photodecomposition. One of two problems is currently associated with the use of optically transparent, wide-bandgap semiconducting oxide coatings: either a thick film blocks charge transmission, or a thin film still allows photocorrosion.

Wrighton et al. (1978) have shown that chemical bonding of electroactive polymers to the semiconductor surface affects the interfacial charge-transfer kinetics such that the less thermodynamically favored redox reaction in the electrolyte predominates over the thermodynamically favored semiconductor decomposition reaction. To date, emphasis has been placed on improving the catalytic properties of p-type electrodes, where photocorrosion by reductive processes is not a major problem. The overvoltage for the evolution of hydrogen from p-type electrode surfaces is normally quite large. It has been demonstrated, however, that the catalytic property of a p-type Si photocathode is enhanced for hydrogen evolution when a viologen derivative is chemically bonded to the electrode surface and Pt particles are dispersed within the polymer matrix: (R. N. Dominey, N. S. Lewis, J. A. Bruce, D. C. Bookbinder and M. S. Wrighton, *J. Am. Chem. Soc.*, 104, 467 (1982)). The viologen mediates the transfer of the photogenerated electron to $H^+$ by the platinum to form $H_2$. A thin platinum coating directly on the p-type silicon surface also improves the catalytic performance of the electrode: (Y. Nakato, S. Tonomura, and H. Tsubomura, *Ber. Bunsenges. Phys. Chem.* 80, 1289 (1976)). Charge conduction is generally much higher in electrically conductive polymers than in typical electroactive polymers.

Accordingly, work on charge conductive polymers in the field of photoelectrochemistry has been directed toward stabilization of electrodes against photodegradation in electricity-generating cells. Charge conductive polymers are known to protect certain semiconductor surfaces from photodecomposition, by transmitting photogenerated holes in the semiconductor to oxidizable species in the electrolyte at a rate much higher than the thermodynamically-favored rate of decomposition of the electrode. For example, R. Noufi, A. J. Frank, A. J. Nozik, *J. Am. Chem. Soc.*, 103, 1849 (1981) demonstrated that coating n-type silicon semiconductor photoelectrodes with a charge conductive polymer, such as polypyrrole, enhances stability against surface oxidation in electricity-generating cells. As also reported by R. Noufi, D. Tench, L. F. Warren, *J. Electrochem. Soc.*, 127, 2310 (1980), n-type GaAs has also been coated with polypyrrole to reduce photodecomposition in electricity-generating cells, although the polymer exhibited poor adhesion in aqueous electrolyte.

Despite the promising use of polypyrrole on n-type silicon to suppress photodecomposition, heretofore, whether or not conductive polymers in general could be used in conjunction with catalysts was unknown. Moreover, it can be seen that the discovery of uses for various polymer coatings on photoelectrodes has been on a case by case basis because of the empirical nature of the effects on any particular semiconductor and/or the interaction with a given electrolyte environment.

SUMMARY OF THE INVENTION

According to the present invention, improved electrodes overcoated with conductive polymer films and preselected catalysts are provided. The electrodes typically comprise an inorganic semiconductor overcoated with a charge conductive polymer film comprising a charge conductive polymer in or on which is a catalyst or charge-relaying agent.

BRIEF DESCRIPTION OF THE DRAWINGS

FIG. 2 is a plot of oxygen production with time and charge density passed in a cell using an electrode of the present invention as compared to other electrodes.

FIG. 3 is a bar graph depicting the percentage of oxygen and cadmium ions produced after 49 $C/cm^2$ were passed in the comparison of FIG. 2.

DETAILED DESCRIPTION OF THE PREFERRED EMBODIMENTS

Figure 1:
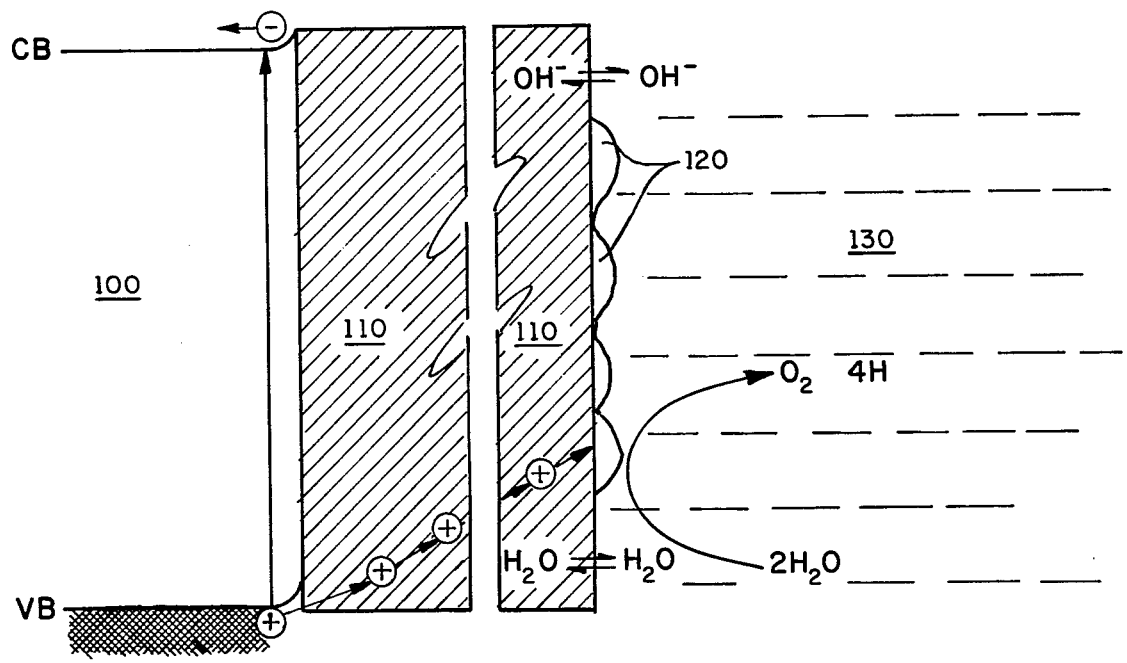
FIG. 1 is a conceptual representation of one embodiment of the present invention.

According to the present invention, improved electrodes are provided wherein charge conductive organic polymer films have been chemically or physically attached to or overcoated onto the surface of an inorganic semiconductor electrode, the polymer of the film having at least one catalyst and/or charge-relaying reagent on its surface and/or incorporated therein. The improved electrodes are particularly well suited for use in photoelectrochemical cells, e.g., for generation of fuel or useful chemicals. The conductive polymer not only provides a means for securing a catalyst and/or charge relay for generation of the particular fuel or chemical, but the polymer film also can provide a barrier to direct photodegradation or chemical degradation of the electrode. By charge conductive polymer is meant polymers with an extended pi-bonded system. These include polymers which, by virtue of their chemical structure, have a backbone which permits charge conduction. Polymers of this type include polyacetylene-type polymers and poly(p-phenylene) type polymers, (i.e., derivatives of poly(p-phenylene) or poly(p-phenylene)sulfide) and the heterocyclic aromatic polymers with extended pi-bonding, (e.g., polypyrrole, poly(3,4-dimethylpyrrole), poly(3-methylthiophene). Also included are the phthalocyaninatometal polymers in which the central metal is a transition metal, (e.g. $Fe^{2+}$, $Co^{2+}$, and $Co^{3+}$) and the organic bridging ligands contain delocalized pi-electrons (e.g., pyrazine, 4,4'-bypyridine, and 1,4-diisocyanobenzene). Also included are the bridged-stacked phthalocyanines or metallophthalocyanines where pi-orbital overlap occurs at the phthalocyanine rings. Also included are charge conductive polymers derived from the addition of metals or graphite particles to organic polymers. All of these conductive polymers work synergistically with catalyst and/or charge-relaying agents. By charge-relaying agents is meant redox species associated with the polymer that serve to transmit the photogenerated charges to the final desired charge-transfer reactions. For purposes of describing the present invention the term "redox enhancer38 is interchangeably used to generically describe catalysts and/or charge-relaying agents useful in the practice thereof.

In the photoelectrochemical cells of the present invention, the n-p junction known in solid-state photovoltaic devices is generally replaced with an n-electrolyte-p (or metal) junction. Electron-hole pairs are generated by the absorption of light in either or both semiconductor electrodes. The electron-hole pairs are separated by the semiconductor-electrolyte junction barrier and are injected at the respective electrodes to produce electrochemical oxidation and reduction reactions. While the present description is in terms of a single bandgap n-type and/or p-type material, as is known by those skilled in the art, the n-type electrode may consist of multiple layers or combinations of more than one bandgap n-type material, and the p-type electrode may consist of multiple layers or combinations of more than one bandgap p-type material. Such multiple layers or combinations of different bandgap materials permit absorption of different wavelengths of light for better utilization of the solar spectrum.

There are certain considerations concerning the selection of electrodes for a photoelectrochemical cell consisting of a semiconductor anode, electrolyte, and dark cathode. In the absence of significant hot-charge injection, minimal external bias requires that the conduction-band edge, more specifically the flat-band potential, lies negative of the redox potential of the desired reduction reaction plus any overpotential at the cathode to drive the reaction at a reasonable rate. Similarly, the valence-band edge should lie positive of the redox potential of the desired oxidation reaction plus any overpotential at the semiconductor anode to drive the oxidation reaction at a reasonable rate. Taken together, these requirements dictate the bandgap energy to drive the desired reaction. In principle, higher conversion efficiencies are possible when a photoanode is combined with a suitably matched photocathode. The conduction-band edge of the photocathode must lie negative of the redox potential of the reduction reaction plus any overpotential. In addition, the valence-band edge of the photocathode must be positive of the conduction-band potential of the photoanode. The sum of the bandgap energies must satisfy the thermodynamics and the kinetic requirements to drive the desired reactions. Alternatively, suitably matched multiple photoelectrodes with different bandgaps can be operated in series with respect to the optical path. In one embodiment, an improved photoelectrochemical cell for the photoactivated decomposition of water into $H_2$ and $O_2$ is provided which includes coated semiconductors with bandgaps between 0.5 eV and 3.0 eV.

While single-crystal material may be employed, the electrodes of the invention may also be in the form of thin films (about 500 Å to 10 $\mu$m in thickness), and may be either polycrystalline, with a crystallite size ranging from about 25 Å to 1 mm, or amorphous. The films may be conveniently fabricated by conventional deposition procedures such as DC sputtering, RF sputtering, chemical vapor deposition, thermal evaporation, and anodization, or thermal oxidation of metals. Also included with the semiconductors useful in the practice of the present invention are particularly semiconductors ranging in size from 2 nm or less, to 300 nm, or larger, 300 nm to 1 mm.

n-Type materials useful in the present invention involve suitably doped semiconductors, multiple layers thereof, or combinations thereof, with bandgaps between 0.5 and 3.0 eV including elements (e.g., Si, Se), transition metal oxides (e.g., $Fe_2O_3$, $Fe_2TiO_5$), II-VI Compounds, III-V Compounds, III-VI Compounds, mixed crystals of II-VI Compound, (e.g., $CdSe_xTe_{1-x}$), mixed crystals of III-V Compounds, IV-VI Compounds, I-III-VI$_2$ Compounds (e.g., $CuInSe_2$), II-IV-V$_2$ Compounds (e.g., $ZnSiP_2$), transition metal chalcogenides (e.g., $ZrS_2$, $MoS_2$, $WSe_2$), and various other ternary compounds where the Roman numerals refer to a group or groups of the Periodic Table of elements.

Preferred n-type semiconductors, multiple layers thereof, or combinations thereof, have bandgaps ranging from about 0.5 to 2.3 eV and include Si, Se, $Fe_2O_3$, $Fe_2TiO_5$, $FeTiO_4$, $Hg_2Nb_2O_7$, $Hg_2Ta_2O_7$, CdSe, CdTe, GaP, GaAs, InP, AlAs, AlSb, GaSb, HgS, $HfS_2$, $HfSe_2$, $MoS_2$, $MoSe_2$, $MoTe_2$, $PtS_2$, $RuS_2$, $TiS_2$, $WS_2$, $WSe_2$, $ZrS_2$, $ZrSe_2$, $CuInS_2$, $CuInSe_2$, $CdSe_xTe_{1-x}$, $CuInS_2$, $CuInSe_2$, $AgInS_2$, $AgInSe_2$, $ZnGeP_2$, $CdSiP_2$, $CdGeP_2$, and $CdSnP_2$.

p-Type materials useful in the present invention involve suitably doped semiconductors, multiple layers thereof, or combinations thereof, with bandgaps between 0.5 and 3.0 eV, including elements (e.g., Si), transition metal oxides, II-VI Compounds, III-V Compounds, III-VI Compounds, I-III-VI$_2$ Compounds, II-IV-V$_2$ Compounds, transition metal chalcogenides, and various other ternary compounds where the Roman numerals refer to a group or groups of the Periodic Table of elements.

Preferred p-type semiconductors, multiple layers thereof or combinations thereof, have bandgaps ranging from about 0.5 eV to 2.3 eV and include Si, Ge, $Cu_2O$, $Cu_2S$, CdTe, ZnTe, GaP, GaAs, InP, AlAs, AlSb, GaSb, InP, $CuInS_2$, $CuGaS_2$, $CuInSe_2$, $CuAlSe_2$, $ZnSiAs_2$, $ZnGeP_2$, $ZnSnAs_2$, $ZnSnP_2$, GaSe, GeS, GeSe, GeTe, SnS, SnSe, $MoS_2$, $WS_2$, $MoSe_2$, $WSe_2$, and $MoTe_2$.

The electrolyte must have a sufficiently high conductivity in order to minimize cell resistance and reduce losses. The electrolyte is conveniently an aqueous solution made appropriately neutral, acidic, or basic. Alternatively, a solid state electrolyte for ionic conduction typical of those known in the art may be employed.

Solvents useful in forming electrolyte solutions for purposes of this invention should show good transparency to visible light. Such solvents include water and solvents miscible with water such as alcohols and tetrahydrofuran. Sufficient conductivity of the solution may be provided by dissolving in the solvent a conductivity-supporting electrolyte such as tetrabutylammonium chloride, bromide, perchlorate, fluoroborate, lithium chloride, lithium perchlorate, and the like.

Referring to FIG. 1, a semiconductor electrode 100 overcoated with a conductive polymer film, comprising a conductive polymer 110 and a catalyst 120, and the electrolyte 130 are shown for the decomposition of water. It is understood and known in the art that the reactions illustrated in FIG. 1 could be carried out in a cell of similar configuration or in cells with any of the alternative configurations previously discussed.

In operation, upon illumination of the photoelectrode 100, the conductive polymer 110 channels the photogenerated holes 112 to the catalyst 120 before self-oxidation of the photoanode 100 occurs. The catalyst 120 then catalyzes the oxidation of water ($H_2O$) to oxygen ($O_2$). At the counterelectrode (not shown), the cycle is completed with the evolution of hydrogen ($H_2$).

The film-coated electrodes of the present inventions are advantageously utilized in photoelectrochemical cells which use light in the solar spectrum to drive both endergonic and exergonic chemical reactions. In FIG. 1 the light absorbed is used to drive charge transfer between the electrode 100 and the redox catalyst 120 through the conductive film. The electrode-polymer-catalyst takes part in chemical reactions involving water as depicted in FIG. 1, or water and other chemical reagents, such as, but not limited to those in Table 2. For example, one class of reactions involve reacting hydrogen unsaturated molecules and water to form alcohols. Depending on the nature of the film, the conductive polymer film provides semiconductor-like or metal-like properties. As a semiconductor-like material, the charge conductive film shows rectifying properties and determines the overall direction of charge movement between the redox enhancer and the electrode. Alternatively, the rectifying properties can be determined principally by the difference in energy levels of the semiconductor and the electrolyte, the polymer serving principally as a charge mediator. For some polymeric coatings, the metallic-like properties of a film may pin the Fermi level of the semiconductor substrate so that the photovoltage is determined mainly by the semiconductor-polymer junction and is relatively independent of the effective redox couple present in the bulk electrolyte.

In addition, it is possible to select as the conductive film one which can function to provide a barrier to photodecomposition of the electrode by preventing direct contact with the electrolyte. In such instances, the electrode communicates with the electrolyte via the electronic properties of the charge conductive film.

Conductive polymers useful in the practice of the present invention permit manipulation of the interfacial charge-transfer kinetics in a manner which suppresses photodecomposition and which promotes desirable redox reactions. In addition, conductive polymers useful in the practice of the present invention are polymers having good electronic transport properties at high solar intensities (e.g., about 80 to about 140 mV/cm$^2$). The conductive polymers of the present invention act to channel a high density of photogenerated minority carriers from the semiconductors to desirable redox species in the electrolyte at a rate greatly exceeding the rate of photodecomposition of the semiconductor. The polymers also are characterized by a large surface area whereby they can provide a driving force for rapid charge transport from the semiconductor.

While not intending to be bound by this theory, it is believed that the specific interface energetics will depend on whether the redox electrolyte can penetrate the polymer film to the semiconductor, and more specifically they will depend on the activity of the water at the polymer-semiconductor interface. If the polymer film is permeable to the electrolyte as in the case of polypyrrole films in water containing simple anions (e.g. $ClO_4^-$, $SO_4^{2-}$), rectification can be determined principally by the semiconductor-electrolyte junction. For this situation, protection of the semiconductor surface will hinge considerably on the good electronic transport properties of the polymer compared with the photodecomposition rate. Alternatively, a hydrophobic polymer may be desirable if it does not severely affect the desired redox kinetics. Hydrophobicity will reduce solvation effects and thus shift the decomposition potential of the electrode to positive values; however, it can also adversely affect the thermodynamics and kinetics of the desired redox processes.

To protect the semiconductor against photocorrosion, the polymer must be kinetically inert and/or more electrochemically stable than both the semiconductor and the redox electrolyte. Inertness depends on the composition of the redox electrolyte (solvent, redox species, counterions, etc.) The redox electrolyte must efficiently scavenge the transmitted minority carriers from the polymer or from a redox enhancer associated with the polymer, incorporated within or on the surface of the polymer, if chemical corrosion of the polymer itself is to be avoided. Disruption of the electronic unsaturation of the polymer through chemical reactions with the solvent or redox species may produce deterioration of the electrical conductivity of the polymer and a diminished effectiveness in the stabilization of the semiconductor.

The polymer film must conduct to the redox electrolyte minority species, i.e., either holes for n-type semiconductors or electrons for p-type materials, or alternatively may transmit both holes and electrons.

The extinction coefficient of polymers useful in the practice of the present invention for protection of the semiconductor against corrosion is preferably small over the spectral region where the semiconductor absorbs so as not to attenuate the excitation energy of the semiconductor. Also the polymer should strongly adhere to the surface of the semiconductor.

The redox enhancers, i.e., the catalysts and/or charge-relaying agents, used in the practice of the invention may be any of those known in the art. Examples of such redox enhancers are porphyrins, phthalocyanines, macrocyclic metallic complexes, organic dyes, coordination complexes, inorganics and organometallics. The redox enhancer may also be present as particles (2 nm or less to about 300 nm) or larger (300 nm to 1 mm) in size. Representative materials for particles are transition metals, such as platinum, palladium, rhodium, rhenium, ruthenium, iridium and the oxides thereof, silicas and zeolite. The same metals may also be present in various combinations or in supports (e.g., zeolites). The materials may also include semiconductors which may be light-activated.

In selecting a particular redox enhancer consideration must be given to its immobilization onto the electrode surface. The redox enhancer must be chemically or physically attached to the conductive polymers and not detached. As will be known and understood by those skilled in the art, electron accepting or electron donating reagents, i.e., charge-relaying reagents, may be used instead of or in conjunction with catalysts. Typical of such charge-relaying agents are viologen derivatives. The catalysts and/or other charge-relaying reagents may be on the surface of the conductive polymer as depicted in FIG. 1 and/or in the interior of the film. In operation, the catalyst associated with the conductive film accepts charges, i.e., electrons or holes, from the electrode and/or from an electron acceptor or an electron donor in the vicinity of the catalyst in the condensed phase. The polymer conducts charges between the inorganic semiconductor electrode and the catalyst and/or charge-relaying agent.

The following examples are provided by way of illustration and not by way of limitation.

EXAMPLE I

Example I demonstrates the effectiveness of the coated electrodes of the present invention. The results obtained demonstrate that the polymer film protects the n-type semiconductor electrode against photooxidation in the presence of the oxygen evolution reaction in an aqueous electrolyte. The oxidation of water to oxygen is a relatively difficult four-electron reaction which requires the generation of holes with a rather positive redox potential. Holes created and utilized at such high positive potentials in photoexcited semiconductor electrodes generally result in oxidation of the semiconductor itself in addition to, or even to the exclusion of, the oxidation of water. A few large bandgap oxide semiconductors (such as $TiO_2$, $SrTiO_3$, and $Fe_2O_3$) show exceptions to this behavior.

In this example, an electrically conductive polymer (polypyrrole) incorporating a catalyst was used to stabilize a thermodynamically unstable n-type semiconductor (CdS) against photocorrosion and to promote the water-oxidation reaction. A comparison was made of the $O_2$ and $Cd^{2+}$ ion production of naked, catalyst-covered, and polypyrrole-catalyst-coated CdS photoanodes in an aqueous electrolyte.

The bandgap of CdS is 2.4 eV ($\lambda = 517$ nm). In aqueous electrolyte, CdS photocorrodes under anodic bias to produce $Cd^{2+}$ ions and a surface layer of sulfur. The reactions at the photoanode and dark cathode are as follows:

photoanode $$CdS + 2h^+ \rightarrow Cd^{2+} + S \qquad (i)$$

cathode $$2e^- + 2H_2O \rightarrow H_2 + 2OH^- \qquad (ii)$$

If the photocorrosion reaction (i) were inhibited, the kinetically more complex and thermodynamically less favorable oxidation reaction of water would prevail.

$$2H_2 + 4h^+ \rightarrow O_2 + 4H^+ \qquad (iii)$$

This has been accomplished by use of the coated electrodes of the present invention, whereas heretofore production of $O_2$ from bulk CdS electrodes has not been detected.

While the detailed description and examples relate to the photoassisted water-oxidation reaction, it will be known and understood that the complementary water-reduction reaction also takes place.

CdS electrodes (Cleveland crystals) were fabricated from 0.25 $\mu$m diamond polished 5×5×2 mm plate (1-10 $\Omega$cm). Ohmic contacts were made with a gallium-indium eutectic. The less stable (0001) face (predominantly Cd atoms) was chosen for contact with the electrolyte. The wire leads were encased in a glass tube for mounting and all the exposed metals and the edges of the crystals were insulated with RTV silicon resin. The electrodes were etched prior to use in 25% HCl (30 s), rinsed with $H_2O$, etched in 1% $Br_2$/MeOH (30 s), and rinsed again. The polypyrrole films were synthesized potentiostatically under illumination on the CdS surface in a three-electrode, three-compartment cell containing 1.0M pyrrole and 0.3M tetraethylammonium fluoroborate in a nitrogen-bubbled, mechanically stirred, acetonitrile solvent of 0.1% to 1% water. Films were formed at a voltage of about 0.8 V and the photocurrent density was maintained between 100 and 200 $\mu$A/cm² by adjusting the light intensity from a tungsten-halogen lamp. The average thickness of the polymer films was 0.8 $\mu$m as measured with a Dektak surface profile system. The optical train for the photoelectrochemical studies produced a band of radiation between 750 and 350 nm.

The catalyst consisted of $RuO_2$ powder (Alpha Products) immobilized in a thin film of silver paint (SPI, high purity) pipetted onto the surface of either the bare electrode or the polymer-covered electrode.

The electrodes were immersed in 0.5M $Na_2SO_4$ at pH 8.6 in a three-compartment cell. The electrode potential was 0.4 V (SCE). The $O_2$ production was either monitored directly with a Clark-type $O_2$ sensor or measured indirectly with a pH electrode. The two measurements correlated well with each other and with gas chromatograph GC analysis. The gas chromatograph was equipped with a thermal-conductivity detector, a molecular Sieve 5A column, and a He carrier gas. The concentration of $Cd^{2+}$ ions produced during photocorrosion was determined by atomic absorption spectrophotometry.

The light intensity was adjusted to produce an initial photocurrent of about 150 $\mu$A/cm². The radiant power at the bare, catalyst-coated, and polypyrrole-catalyst-covered CdS electrodes were 28, 110, and 80 mW/cm², respectively. The higher light intensities required to produce similar initial photocurrents in the case of the surface-protected electrodes is due to the light absorption by the coatings. Unfortunately, corrosion of the CdS crystal beneath the translucent silicone resin used to mount the semiconductor plate contributed to the total photocurrent as a result of some water seepage between the resin and the front crystal surface. Because of this and the fact that the photocorrosion rate increases with the light intensity, the extent of protection against corrosion provided by the catalyst and polymer-catalyst coatings is underrepresented in FIG. 2. The amount of $Cd^{2+}$ ions produced under the resin was determined at the end of the experiment, and these data were used to provide the correct $O_2$ and $Cd^{2+}$ ions percentages provided in FIG. 3. Referring to FIG. 2, the rate of $O_2$ production of the naked electrode is nearly constant over 45 h of irradiation. During this period, ca. 2 $\mu$mol of $O_2$/cm² was produced, and the rate constant derived from the slope of the curve, the concentration of water, and the number of holes consumed per $O_2$ evolved was $6.0 \times 10^{-10}$ cm/s. The $O_2$ production of the catalyst-coated CdS electrode exhibited an induction period of ca. 2 h, increased linearly with time to ca. 40 h, and then tended to level off. The maximum rate constant was $1.5 \times 10^{-8}$ cm/s, and 35 $\mu$mol of $O_2$/cm² was produced. An induction period for $O_2$ production of ca. 15 h was noted for the polymer-catalyst CdS electrode. Thereafter, the rate of $O_2$ production rose sharply. The rate constant of maximum $O_2$ production was $3.5 \times 10^{-7}$ cm/s, and 69 $\mu$mol of $O_2$/cm² was produced over 32 h.

FIG. 3 correlates the amounts of $O_2$ and $Cd^{2+}$ ions produced after 49 C/cm² were passed. With no coating, about 99% of all the photogenerated holes that contribute to the photocurrent led to the corrosion reaction (eq i). With the addition of the catalyst to the surface of CdS, 21% of the photogenerated holes were directed to $O_2$ production, and 79% were converted to destruction of the semiconductor lattice. The most dramatic improvement in stabilizing CdS from photodegradation and affording $O_2$ production resulted from the combination of polymers and catalysts in which 68% of the photogenerated holes were converted to $O_2$ and 32% produced $Cd^{2+}$ ions. Without the catalyst, the polypyrrole film alone offered little protection against corrosion.

In conclusion, conductive films incorporating a redox enhancer, according to the present invention, have been shown to produce a dramatic improvement in the stability of semiconductor electrodes against photodegradation in an aqueous electrolyte while affording the visible-light-assisted, water-cleavage reaction.

EXAMPLE II

Example II demonstrates the effectiveness of the coated electrodes of the present invention as verified by others in G. Cooper, R. Noufi, A. J. Frank, and A. J.

Nozik, *Nature*, 295, 578 (1982). The results obtained demonstrate that the polymer film enhances the stability of a tantalum electrode against oxidation during oxygen evolution from water.

Normally, a Ta electrode does not evolve $O_2$ in aqueous solution because of the spontaneous development of an insulating oxide layer on the surface at potentials less positive than the $O_2/H_2O$ redox potential.

Polypyrrole films were electrochemically deposited at 0.7 V (SCE) in a three-electrode cell containing a deaerated aqueous solution of about 1M pyrrole and 2.0M LiCl at pH 5.

The Ta substrates were freshly ground or roughened with 600 grit SiC paper before deposition.

Electrochemical measurements were performed on the electrodes in 2M phosphate buffer (pH 6.7).

Current voltage measurements were made on Ta electrodes coated with polypyrrole films in the absence of and in the presence of a 72-Angstrom-thick platinum film formed by argon ion-beam sputtering. No oxygen bubbles could be observed on the polymer surface. The maximum current density obtained with the polypyrrole-coated electrode was less than 0.2 mA/cm$^2$ at 1.4 V (vs. SCE). In marked contrast, the polypyrrole-covered Ta electrode with the catalytic platinum surface produced a current density of 1.3 mA/cm$^2$ at 1.3 V. At 1 mA/cm$^2$ $O_2$ bubbles were observed on the electrode surface. At 1.4 V the current density rose to over 3 mA/cm$^2$. The electrochemical behavior of the Ta/polypyrrole/Pt electrode was indistinguishable from that of an ion-beam-sputtered Pt electrode with respect to $O_2$ production.

The results of the Ta/polypyrrole/Pt study indicated that (1) with a catalytic surface, polypyrrole protects the metal electrode from self-oxidation during $O_2$ evolution where the metal would normally passivate due to an insulating oxide layer; (2) the polymers transmit charges over large distances (12.5 $\mu$m); (3) the overpotential of the polymer is too high for $O_2$ evolution; and (4) when $O_2$ evolution is confined to the outermost polymer water interface, there is no sign of physical or chemical deterioration of the polymer after the passage of ca. 2.3 C/cm$^2$.

Although the foregoing invention has been described in some detail by way of illustration and example for purposes of clarity and understanding, it will be obvious that certain changes and modifications may be practiced within the scope of the invention, as limited only by the scope of the appended claims.

The embodiments of the invention in which an exclusive property or privilege is claimed are defined as follows:

1. An electrode for use in photoelectrochemical cells to effect generating fuels and useful chemicals, said electrode comprising:
   (a) a semiconductor overcoated with a conductive film capable of transporting electrons and holes and comprising a charge conductive polymer for preventing photogenerated holes and electrons from substantially reacting with said electrode; and
   (b) at least one redox enhancer for catalyzing certain chemical reactions required to generate said fuels and useful chemicals and for substantially preventing said photogenerated holes and electrons from reacting with said conductive polymer, said redox enhancer being incorporated within or attached to the surface of said conductive polymer, said redox enhancer being selected from a group consisting of charge-relaying agents.

2. An electrode according to claim 1 wherein said redox enhancer is a catalyst.

3. An electrode according to claim 1 wherein said film further comprises at least one catalyst and at least one charge relaying agent.

4. An electrode according to claim 1 wherein said semiconductor is n-type.

5. An electrode according to claim 1 wherein said semiconductor is p-type.

6. An electrode according to claim 1 wherein said conductive polymer is selected from the group consisting of heterocyclic aromatic polymers with extended pi-bonding, phthalocyaninatometal polymers with organic bridging ligands containing delocalized pi-electrons, bridged stacked metallophthalocyanines where pi-orbital overlap occurs at the phthalocyanine rings, and conductive polymers derived from the addition of metals or graphite particles to organic polymers.

7. An electrode according to claim 1 wherein said redox enhancer is on the surface of said film.

8. An electrode according to claim 1 wherein said redox enhancer is intermixed with said polymer.

9. A photoelectrochemical cell for generating fuels and useful chemicals, said photoelectrochemical cell comprising:
   (a) at least one photoelectrode and an electrolyte containing at least two redox couples wherein said photoelectrode comprises a semiconductor overcoated with a conductive film capable of transporting electrons and holes and comprising a charge conductive polymer for substantially preventing photogenerated holes and electrons from reacting with said photoelectrode; and
   (b) a redox enhancer for catalyzing certain chemical reactions required to generate said fuels and useful chemicals and for substantially preventing said photogenerated holes and electrodes from reacting with said conductive polymer, said redox enhancer being incorporated within or attached to the surface of said conductive polymer, said redox enhancer being selected from a group consisting of catalysts for said redox couples and charge-relaying agents.

10. A cell according to claim 9 wherein said redox enhancer is intermixed with said polymer.

11. A cell according to claim 9 wherein said redox enhancer is on the surface of said film.

12. A cell according to claim 9 wherein said redox couples are selected from the group consisting of (a) $H^+/H_2$ and $O_2/H_2O$, (b) $CO_2/HCOOH$ and $O_2/H_2O$, (c) $CO_2/HCHO$ and $O_2/H_2O$, (d) $CO_2/CH_3OH$ and $O_2/H_2O$, (e) $CO_2/CH_4$ and $O_2/H_2O$, (f) $N_2/NH_3$ and $O_2/H_2O$, and (g) $CO_2/C_6H_{12}O_6$ and $O_2/H_2O$.

13. A cell according to claim 9 wherein said semiconductor has a bandgap between 0.5 and 3.0 eV.

14. A cell according to claim 9 wherein said one photoelectrode is n-type.

15. A cell according to claim 9 wherein said photoelectrode material is selected from the group consisting of amorphous material, thin film material, single crystal material, and multiple layered material.

16. A cell according to claim 14 further comprising a second electrode which is metal.

17. A cell according to claim 14 further comprising a second electrode which is a p-type photoelectrode.

18. A cell according to claim 9 wherein said one photoelectrode is p-type.

19. A cell according to claim 18 further comprising a second electrode which is metal.

20. A cell according to claim 9 wherein said one photoelectrode comprises a particulate semiconductor.

* * * * *